United States Patent Office 2,724,447
Patented Nov. 22, 1955

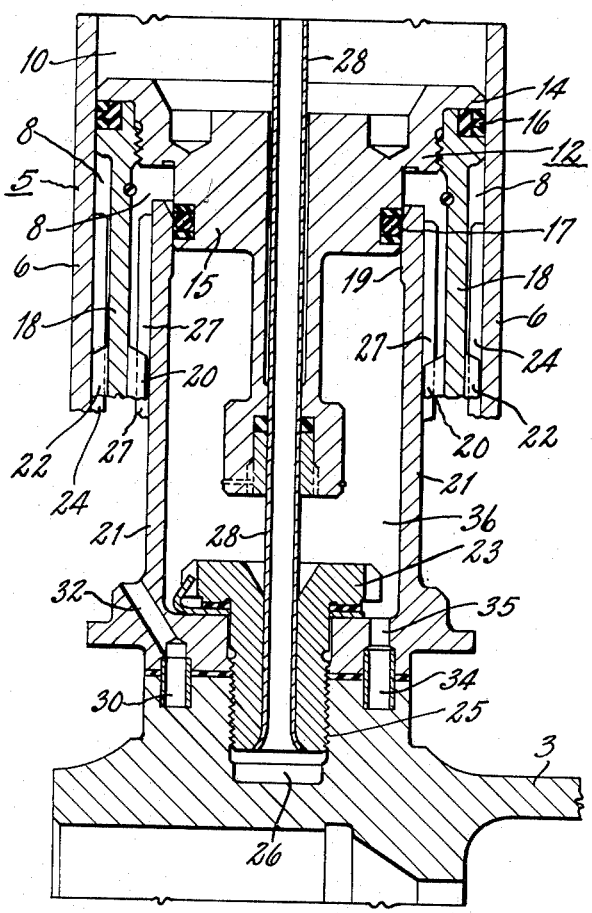

2,724,447

PROPELLER MECHANISM

Morton Brooks, Dayton, Ohio, assignor to General Motors Corporation, Detroit, Mich., a corporation of Delaware Application February 2, 1952, Serial No. 269,663

11 Claims. (Cl. 170—160.33)

The present invention relates to variable pitch propellers and more particularly to a servo-motor for adjusting the blades of a variable pitch propeller.

One of my objects is to provide a servo-motor for adjusting the blades of a variable pitch propeller that incorporates means constituting an intermediate stop for limiting blade movement, and a fluid pressure system for actuating the servo-motor that incorporates means for selectively rendering the intermediate stop effective or ineffective to limit blade movement. The aforementioned and other objects are accomplished by providing a servo-motor or torque unit with stop means operable to limit the low pitch position of a propeller blade, and selectively operable means in the fluid pressure system actuating the servo-motor for rendering the stop means effective or ineffective. Specifically, the servo-motor or torque unit is provided with two concentric cylinders of different diameter that cooperate respectively with a piston having a head provided with two concentric portions of different diameter. The two concentric portions of the piston head are provided with means effecting sealing engagement between the engaging surfaces of the cylinders and piston head portions. One portion of the piston head divides its cooperable cylinder into two chambers, an increase pitch chamber and a decrease pitch chamber. The other portion of the piston head and its cooperable cylinder are disposed within the increase pitch chamber. The increase and decrease pitch chambers are connected by fluid passages to a fluid pressure system that directs fluid flow to and from these chambers for effecting movements of the piston. Reciprocatory movements of the piston are transmitted by mechanical means to effect rotary movement of a propeller blade. A fluid passage connects the other cylinder with a manually controlled pitch stop valve in the fluid pressure system that prevents drain flow when it is closed.

The other cylinder and its associated piston head portion constitute a stop for limiting movement of the piston when the piston has moved to a position where the portion of the piston head is in sealing engagement with the bore of the cylinder disposed in the increase pitch chamber, and the pitch stop valve is closed. Since piston movement is stopped by reason of trapped fluid, movement of the blades toward a lesser pitch angle is also stopped. In this manner a low pitch stop is provided by the torque unit. The stop will be effective to limit the low pitch position of the propeller blades regardless of the means causing movement toward a lesser pitch position, for example, a failure in the fluid pressure system which actuates the torque unit thereby enabling the blades to seek a lesser pitch position due to the centrifugal and aerodynamic twisting moments acting on the blades during propeller rotation.

The fluid pressure system for actuating the servo-motor or torque unit comprises a pump which supplies fluid under pressure to a distributor valve which is controlled by suitable governing means and directs the flow of fluid to and from the increase and decrease pitch chambers of the torque unit to vary the pitch of the blades so as to maintain substantially constant speed propeller operation. The fluid pressure system is further provided with the pitch stop valve normally blocking any flow of fluid to drain from the cylinder disposed within the increase pitch chamber of the torque unit. Manually controlled means are provided for moving this valve to allow fluid to drain from the cylinder within the increase pitch chamber when the pilot deliberately selects a blade angle position below the intermediate low pitch position normally established by the stop means within the torque unit.

Further objects and advantages of the present invention will be apparent from the following description, reference being had to the accompanying drawings wherein a preferred embodiment of the present invention is clearly shown.

In the drawings:

Fig. 1 is a perspective view of a variable pitch propeller.

Fig. 2 is an enlarged fragmentary cross-sectional view of a blade adjusting servo-motor or torque unit attached to a propeller hub.

Fig. 3 is a schematic diagram of a fluid circuit for operating the variable pitch propeller.

Referring more particularly to Fig. 1 of the drawings, 1 represents a shaft for rotating the propeller, 2 represents a regulator rotatable with the propeller, 3 represents a propeller hub attached to the shaft 1, and 4 represents a blade of the propeller. The propeller is of the general type disclosed in the Blanchard et al. Patents 2,307,101 and 2,307,102, wherein the fluid pressure system for actuating blade adjusting torque units rotates with the propeller and is housed within the regulator 2.

Referring to Fig. 2 of the drawings, a torque unit, designated generally by 5, for adjusting the propeller blades 4 is shown in cross-section. The servo-motor or torque unit 5 comprises a cylinder 6 which is rotatably mounted on the propeller hub 3 by any suitable means, not shown, and is rigidly attached to the root end portion of a propeller blade rotatably mounted on the hub by any suitable means, not shown. Disposed within the cylinder 6, and dividing the cylinder into an increase pitch chamber 8 and a decrease pitch chamber 10, is a piston designated generally by 12. The piston 12 is provided with integral, concentric head portions 14 and 15 of different diameter. Piston head portion 14 has a greater diameter than piston head portion 15 and is provided with sealing means 16 that insure a fluid-tight engagement between the surface of piston head portion 14 and the inner surface of cylinder 6. The smaller diameter of piston head portion 15 is, likewise, provided with sealing means 17 that insure a fluid-tight engagement between the cooperable surfaces of piston head portion 15 and an inner surface 19 of a cylinder 21 disposed within the increase pitch chamber 8. The cylinder 21 is formed with a beveled edge (Fig. 2) to facilitate the entrance of the piston sealing means 17 upon downward movement of the piston 12, as viewed in Fig. 3. The cylinder 21 is rigidly attached to the hub 3 by means of a hollow nut 23 having threaded engagement with a bore 25 on the hub. Thus, the cylinder 21, having helical spline teeth 27 integral with its outer peripheral surface, is rotatable with the hub 3 but is restrained from movement relative to the hub.

A cylindrical skirt member 18 threadedly engages the larger portion of the piston head 14 and is provided with helical spline teeth 20 and 22 on its inner and outer peripheral surfaces, respectively. Cylinder 6 is also provided with helical spline teeth 24 integral with an end portion of the inner wall of the cylinder. Cylinder 21, sleeve 18 and cylinder 6 are all concentrically disposed within the root end portion of a propeller blade. Outward movement of the piston 12 and its associated skirt 18, as viewed in Fig. 2, effects rotary movement of the cylinder 6 through the series of helical splines 27, 20, 22 and 24 in a manner disclosed in the Blanchard et al. patents previously referred to, which movement is transmitted to the propeller blade, to effect an increased pitch position. Inward movement of the piston effects a decreasing pitch adjustment of the blade. To effect movements of the piston 12, passages are provided in the hub 3, not shown, for directing the flow of fluid to and from the increase pitch chamber 8 and the decrease pitch chamber 10, under the control of the fluid pressure system contained in the regulator 2. One of the fluid passages in the hub 3 terminates in a chamber or pocket 26 in the hub, this chamber being connected by a tube 28 passing through an aperture in the nut 23 and an aperture in the piston 12 and opening into the decrease pitch chamber 10. Another of the passages in the hub 3 terminates in a pocket or chamber 30 which is connected by a bore 32 in the cylinder 21 through which fluid may flow through the clearance space between the engaging helical spline teeth 27, 26, 22 and 24 into the increase pitch chamber 8. A third passage in the hub 3 terminates in a chamber or pocket 34 which is connected by passage 35 to a bore 36 of cylinder 21, this passage allowing drain from cylinder 21 only when a control valve, to be later described, in the regulator is open. Normally, the engagement of drain limiting seal 17 with surface 19 of the cylinder 21, as shown in Fig. 2, establishes an intermediate low pitch stop.

Referring to Fig. 3 of the drawings, the fluid pressure system for effecting pitch changing movement of propeller blades 4 comprises a pump 40 driven continuously during propeller rotation having an inlet at 41 and an outlet at 42. The pump 40 supplies fluid under pressure through a check valve 43, which prevents fluid flow back through the pump, and into a trunk line 45. The trunk line 45 is provided with a passage 46, communicating with a check valve 47, which acts as a pressure relief valve to limit the maximum pressure in the system. Trunk line 45 also communicates with a port 48 of a distributor valve 50. The distributor valve 50 comprises a valve guide 51 having spaced ports 52 and 54 within which a plunger 53 having spaced lands 55 and 57 that cooperate with ports 52 and 54, respectively, is adapted to be moved.

One end of the plunger 53 is pivotally connected at 56 to a floating lever 58, constituting governing means. A compressing spring 60 acts on the lever 58 intermediate its ends and acts to maintain the lever against a movable fulcrum 62. During rotation of the propeller and the regulator within which the fluid pressure system, shown in Fig. 3, is disposed, centrifugal force tends to move the plunger 53 upwardly, as viewed in the drawings. With a predetermined position of the movable fulcrum 62, the centrifugal force, acting to move the plunger upwardly, and the force of spring 60, opposing the movement of plunger 53 upwardly by reason of the interconnection of the lever 58 and the plunger, will maintain the plunger in an equilibrium position wherein lands 55 and 57 will close ports 52 and 54, respectively, and block fluid flow from line 45 through lines 64 and 68 to the servo-motor 5. When this condition prevails, the propeller blades 4 are rotating at a speed selected by the position of movable fulcrum 62. Movements of fulcrum 62 and, hence, the speed of propeller operation can be selected by movements of control lever 70 which is connected by a mechanical linkage 69 to the fulcrum 62.

Lines or passages 64 and 68 are connected, respectively, to the increase pitch chamber 8 and the decrease pitch chamber 10 of the servomotor or torque unit 5. The torque unit 5 is schematically shown in Fig. 3 of the drawings as having its piston 12 connected by means of a rod 71 provided with a rack 72 that meshes with a gear 73 attached to the propeller blade 4. Thus, reciprocatory movements of the piston 12 will effect rotation of the blade 4 to vary the pitch position thereof. Moreover, the torque unit 5 is shown diagrammatically as having concentric cylinders 6 and 21, and piston head portions 14 and 15, respectively, cooperable therewith. Further, the cylinder 21, disposed within the pitch chamber 8, is shown as having a passage 74 that leads to a pitch stop control valve 75. The pitch stop control valve comprises a guide 76 provided with a port 77 and having a movable piston valve element 78 therein. Piston valve element 78 is provided with a rod 79 which is held in engagement with a surface of a cam member 80 by means of a spring 82. The cam member 80 is provided with two surfaces 81 and 83, and is adapted to be moved by the control lever 70 through a mechanical linkage 84. When rod 79 of the piston valve element is in engagement with surface 81 of the cam member, piston 78 will prevent fluid from flowing through passage 74 and port 77 to drain. However, when rod 79 is in engagement with surface 83 of the cam member, the piston 78 will be moved upwardly to allow fluid to flow through passage 74 and port 77 to drain.

With the control lever 70 in a position calling for constant speed propeller operation, as shown in Fig. 3, piston valve 78 will block fluid flow from bore 36 through passage 74 to drain. Hence, should the governor valve 50 respond to an under-speed condition and direct flow from line 45 through ports 48 and 54, passage 68 to the decrease pitch chamber 10, and allow fluid to drain from increase pitch chamber 8 through passage 64 and port 52, the engagement of the seal 17 attached to piston head portion 15 with the surface 19 of the cylinder 21 will establish the intermediate low pitch position to which the blade 4 is movable. Likewise, should the fluid pressure system become defective by reason of a failure somewhere in the fluid pressure system, the blades 4 will not be able to move below the low pitch stop established by the torque unit 5, under the urge of aerodynamic and centrifugal twisting moments.

However, should the aircraft pilot move the lever 70 about its pivot 85 counterclockwise, as viewed in Fig. 3 of the drawings, movable fulcrum 62 will be moved to the left as well as cam member 80. Movement of cam member 80 to the left will result in upward movement of the piston valve 78 by reason of rod 79 engaging surface 83 of the cam. Movement of fulcrum 62 to the left will unbalance the equilibrium forces of the spring and centrifugal force acting on the plunger 53 so that the plunger will be moved downwardly, as viewed in Fig. 3. In this instance fluid will flow from line 45 to the decrease pitch chamber 10 of the torque unit and fluid will drain from the increase pitch chamber 8. As the piston valve 78 no longer blocks flow of fluid from the bore 36 of the cylinder 21, through passage 74 and port 77, the blades 4 may be moved to any selected low pitch position. In this instance the range of movement of the piston 12, and hence the blade 4, is limited only by positive engagement of the piston with the end walls of the cylinder 6.

It is readily apparent that a blade adjusting torque unit according to the present invention embodies an intermediate pitch stop that is extremely reliable, by providing a secondary chamber within the increase pitch chamber with a valve controlled drain passage. Movements of the piston, and, consequently, blade motion will be stopped by trapped fluid in the torque unit when the piston reaches a predetermined position within the torque unit. Furthermore, by providing a separate and independent valve for controlling the drain flow from the secondary torque unit chamber, the probability of a failure in the pitch stop mechanism is greatly reduced.

While the embodiment of the present invention as herein disclosed, constitutes a preferred form, it is to be understood that other forms might be adopted.

What is claimed is as follows:

1. In a variable pitch propeller having blades movable within a range of pitch positions, the combination including, a servomotor operatively connected to the blades for adjusting the pitch position of said blades, a fluid pressure system including a source of fluid pressure and valve means operatively connected with said source and said servomotor for directing fluid flow from said pressure source to said servomotor, said servomotor including a cylinder having an increase pitch chamber and a decrease pitch chamber, intermediate stop means in said increase pitch chamber operable to trap fluid therein for establishing a low pitch position for said blades, and means operatively connected with said fluid pressure system for selectively rendering said stop means effective or ineffective.

2. In a variable pitch propeller having blades movable within a range of pitch positions, the combination including, a servomotor operatively connected to the blades for adjusting the pitch position of said blades, a fluid pressure system including a source of fluid pressure and valve means operatively connected with said source and said servomotor for directing fluid flow from said pressure source to said servomotor, said servomotor including a cylinder and a piston, said piston having a pair of head portions of different diameter, intermediate stop means including one of said piston head portions operable to trap fluid in said cylinder for establishing a low pitch position for said blades, and means operatively connected with said fluid pressure system for selectively rendering said stop means effective or ineffective.

3. In a variable pitch propeller having blades movable within a range of pitch positions, the combination including, a servomotor operatively connected to the blades for adjusting the pitch position of said blades, a fluid pressure system including a source of fluid pressure and valve means operatively connected with said source and said servomotor for directing fluid flow from said pressure source to said servomotor, said servomotor including a cylinder and a piston, said piston having a pair of head portions of different diameter, one of said piston head portions dividing said cylinder into an increase pitch chamber and a decrease pitch chamber, means disposed within said increase pitch chamber and cooperable with the other of said piston head portions operable to trap fluid therein for establishing an intermediate low pitch stop for said blades, and means operatively connected with said fluid pressure system for selectively rendering said low pitch stop effective or ineffective.

4. In a variable pitch propeller having blades movable within a range of pitch positions, the combination including, a servo-motor operatively connected to the blades for adjusting the pitch position of said blades, a fluid pressure system including a source of fluid pressure and valve means operatively connected with said source and said servo-motor for directing fluid flow from said pressure source to said servo-motor, said servo-motor including a cylinder and a piston, said piston having a pair of head portions of different diameter, the larger of said piston head portions dividing said cylinder into an increase pitch chamber and a decrease pitch chamber, a secondary chamber disposed in said increase pitch chamber and cooperable with the smaller of said piston head portion to trap fluid therein for establishing an intermediate low pitch stop for said blades, and means operatively connected with said fluid pressure system for selectively rendering said low pitch stop effective or ineffective.

5. In a variable pitch propeller having a blade operatively connected to a hub and mounted for rotation with respect thereto to vary the pitch position of the blade, the combination including a torque unit for adjusting the pitch position of the blade, said torque unit including a cylinder and a piston, means interconnecting said piston and said blade to provide for adjustment of blade pitch upon movement of said piston, means for introducing fluid pressure to said piston to effect movements of the said piston, said piston having a pair of head portions of different diameter, intermediate stop means including one of said piston head portions operable to trap fluid within said cylinder for establishing a low pitch position for said blade, and means operatively connected with said cylinder for selectively rendering said stop means effective or ineffective.

6. In a variable pitch propeller having a blade operatively connected to a hub and mounted for rotation with respect thereto to vary the pitch position of the blade, the combination including a torque unit for adjusting the pitch position of the blade, said torque unit including a cylinder and a piston, means interconnecting said piston and said blade to provide for adjustment of blade pitch upon movement of said piston, means for introducing fluid pressure to said piston to effect movements of the said piston, a second cylinder disposed within said torque unit, said piston having a pair of head portions of different diameter, means operable to trap fluid in said second cylinder including said second cylinder and one of said piston head portions for establishing an intermediate low pitch stop for said blade, and means operatively connected with said second cylinder for selectively rendering said stop effective or ineffective.

7. In a variable pitch propeller having a blade operatively connected to a hub and mounted for rotation with respect thereto to vary the pitch position of the blade, the combination including a torque unit for adjusting the pitch position of the blade, said torque unit including a cylinder and a piston, means interconnecting said piston and said blade to provide for adjustment of blade pitch upon movement of said piston, means for introducing fluid pressure to said piston to effect movements of the said piston, said piston having a pair of concentric head portions of different diameter, a second cylinder disposed within said torque unit, said cylinders being concentric with respect to each other and with respect to said concentric piston head portions, means operable to trap fluid in said second cylinder including said second cylinder and one of said piston head portions for establishing an intermediate low pitch stop for said blade, and means operatively connected with said second cylinder for selectively rendering said stop effective or ineffective.

8. In a variable pitch propeller having a blade operatively connected to a hub and mounted for rotation with respect thereto to vary the pitch position of the blade, the combination including a torque unit for adjusting the pitch position of the blade, said torque unit including a cylinder and a piston, means interconnecting said piston and said blade to provide for adjustment of blade pitch upon movement of said piston, means for introducing fluid pressure to said piston to effect movements of the said piston, a secondary chamber disposed within said cylinder, means operable to trap fluid in said secondary chamber including said secondary chamber and said piston for establishing an intermediate low pitch stop for said blade, and means operatively connected with said secondary chamber for selectively rendering said stop effective or ineffective.

9. In a variable pitch propeller having a blade movable within a range of pitch positions, the combination including, a servo-motor including a pair of concentric cylinders of different diameter and a piston having a pair of concentric head portions of different diameter cooperable therewith, means interconnecting said piston and said blade to provide for adjustment of blade pitch upon movement of said piston, one of said piston head portions dividing one of said cylinders into an increase pitch chamber and a decrease pitch chamber, a fluid pressure system including a source of fluid pressure and valve means operatively connected with said source and said servo-motor for directing fluid flow to and from said chambers to effect movement of said piston, the other of said cylinders and its cooperable piston head portion being disposed within said increase pitch chamber, valve controlled passage means connecting said other cylinder to drain, said other cylinder and its cooperable piston head portion being effective to stop movement of said piston and said blade at a predetermined position by trapping fluid in said other cylinder when said valve controlled passage means blocks fluid flow from said other cylinder to drain, and means operatively connected with said fluid pressure system for selectively blocking and unblocking said valve controlled passage means whereby the range of movement of said blade may be varied.

10. In a variable pitch propeller having blades movable within a range of pitch positions, the combination including, a double acting servo-motor operatively connected to the blades for adjusting the pitch position of said blades, a fluid pressure system including fluid pressure developing means and valve means operatively connected with said pressure developing means and said servo-motor for directing fluid flow from said pressure developing means to either side of said servo-motor so as to increase or decrease the pitch position of said blades, intermediate stop means in said servo-motor operable to trap fluid therein for establishing a low pitch position for said blades, and means operatively connected with said fluid pressure system and independent of said pressure developing means for selectively rendering said stop means effective or ineffective.

11. In a variable pitch propeller having a blade operatively connected to a hub and mounted for rotation with respect thereto to vary the pitch position of the blade, the combination including, a double acting torque unit for adjusting the pitch position of the blade, said torque unit including a cylinder and a piston, means interconnecting said piston and said blade to facilitate adjustment of the pitch position of said blade upon movement of said piston, fluid pressure developing means, means for introducing fluid under pressure to said cylinder on either side of said piston to effect movement of said piston to increase or decrease the pitch position of said blade, intermediate stop means disposed within said cylinder operable to trap fluid therein for establishing a low pitch position for said blade, and means operatively connected with said cylinder and independent of said pressure developing means for selectively rendering said stop means effective or ineffective.

References Cited in the file of this patent
UNITED STATES PATENTS

| | | |
|---|---|---|
| 2,149,388 | Caldwell | Mar. 7, 1939 |
| 2,160,025 | Martin | May 30, 1939 |
| 2,332,786 | Fairhurst et al. | Oct. 26, 1943 |
| 2,477,868 | Forman | Aug. 2, 1949 |
| 2,528,281 | Martin et al. | Oct. 31, 1950 |
| 2,593,910 | Morris et al. | Apr. 22, 1952 |
| 2,609,057 | Crowhurst | Sept. 2, 1952 |